(No Model.) 7 Sheets—Sheet 1.

S. A. WOODS.
PLANING MACHINE.

No. 244,507. Patented July 19, 1881.

Witnesses
Wm. S. Brown
N. P. Ockington

Inventor
S. A. Woods
by his Atty
Lepine C. Rice (No Model.)

7 Sheets—Sheet 2.

S. A. WOODS.
PLANING MACHINE.

No. 244,507.

Patented July 19, 1881.

Witnesses
Wm. S. Brown
N. P. Ockington

Inventor
S. A. Woods
by his Atty
Lepine C. Rice (No Model.)

7 Sheets—Sheet 4.

S. A. WOODS.
PLANING MACHINE.

No. 244,507.

Patented July 19, 1881.

Witnesses
Wm. S. Brown
N. P. Ockington

Inventor
S. A. Woods.

(No Model.)

7 Sheets—Sheet 5.

S. A. WOODS.
PLANING MACHINE.

No. 244,507.

Patented July 19, 1881.

Witnesses
Wm. S. Brown
N. P. Ockington

Inventor
S. A. Woods
by his Atty
Depine C. Rice (No Model.)

S. A. WOODS.
PLANING MACHINE.

No. 244,507.

7 Sheets—Sheet 6.

Patented July 19, 1881.

Witnesses
Wm. S. Brown
N. P. Ockington

Inventor
S. A. Woods.
by his Atty
Lepine C. Rice (No Model.)  7 Sheets—Sheet 7.
S. A. WOODS.
PLANING MACHINE.
No. 244,507.  Patented July 19, 1881.
Fig. 7
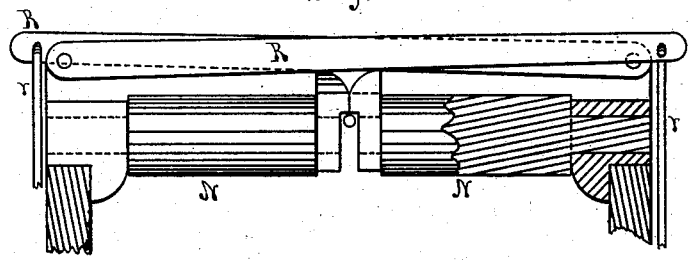
Fig. 8
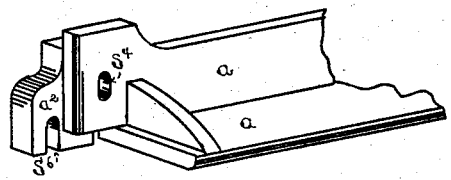
Fig. 10  Fig. 9
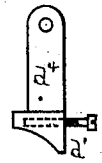 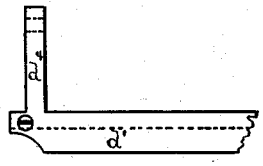
Fig. 11
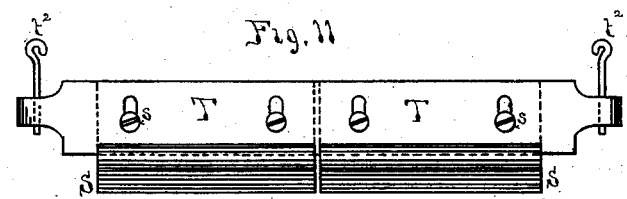
Witnesses  Inventor

UNITED STATES PATENT OFFICE.

SOLOMON A. WOODS, OF BOSTON, MASSACHUSETTS.

PLANING-MACHINE.

SPECIFICATION forming part of Letters Patent No. 244,507, dated July 19, 1881.

Application filed March 27, 1880. (No model.)

*To all whom it may concern:*

Be it known that I, SOLOMON A. WOODS, of Boston, State of Massachusetts, have invented a new and useful Planing-Machine, of which the following is a specification.

My invention relates to improvements in planing-machines in which different thicknesses of stock may be planed upon one or both sides, and machines in which more than one board may be operated upon at one time; and the objects of my improvement are, first, to provide a machine in which automatically-adjusting feed-rolls are used to feed the stock to the cutter; second, to combine with such adjustable rolls self-adjustable chip-breakers; third, to combine with an under cutter a pair of draft-rollers which are adjustable with the other parts of the machine, and one of which can be swung either perpendicularly or horizontally out of its operative position; fourth, to connect such feed-roll with the driving-gear by a train in such manner that the train can be readily detached from the feed-roll to permit of its removal.

The nature of the invention will fully appear from the subjoined description when considered with reference to the accompanying drawings, forming part of this specification.

Figure 1:
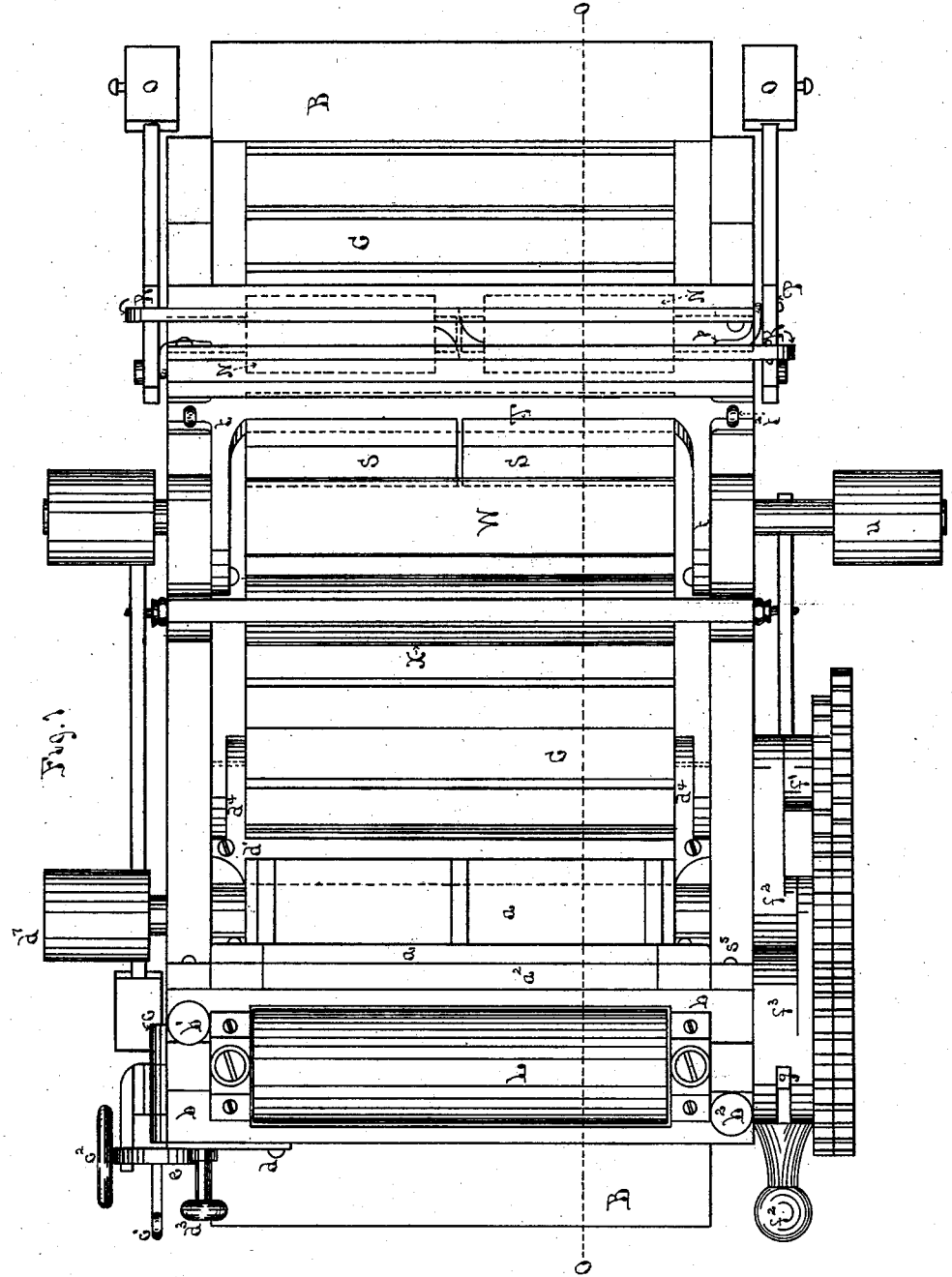
Figure 2:
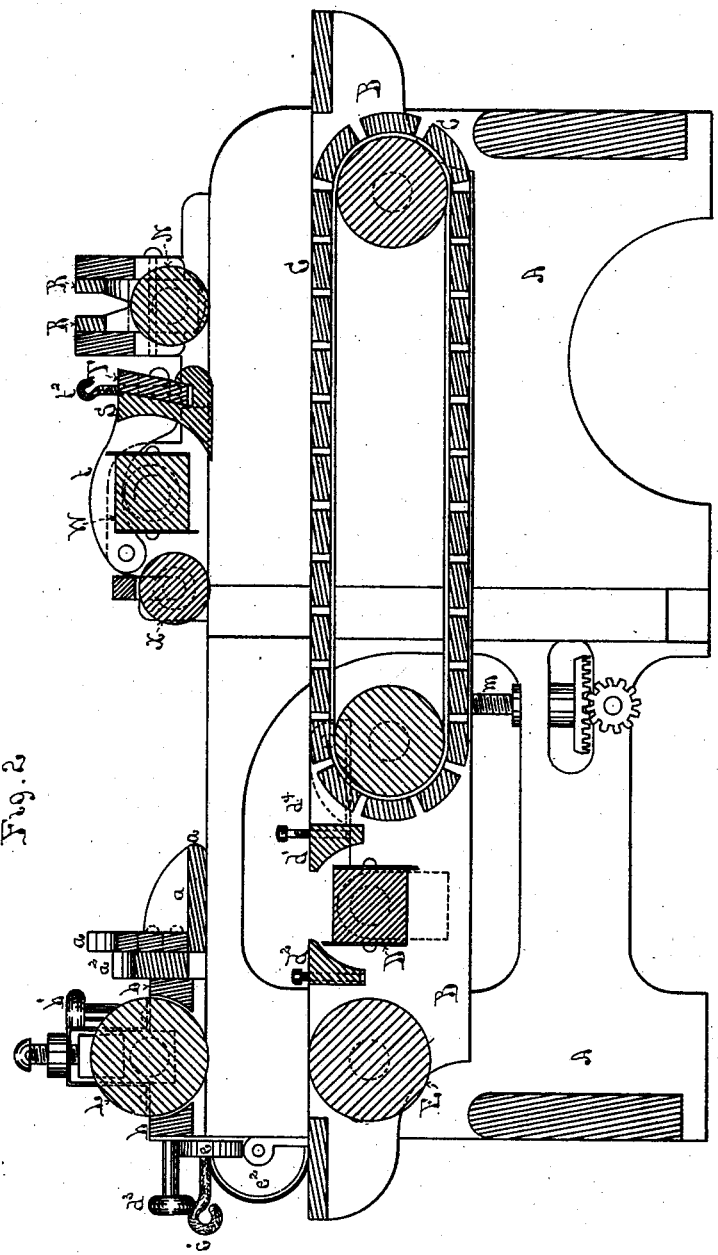
Figure 3:
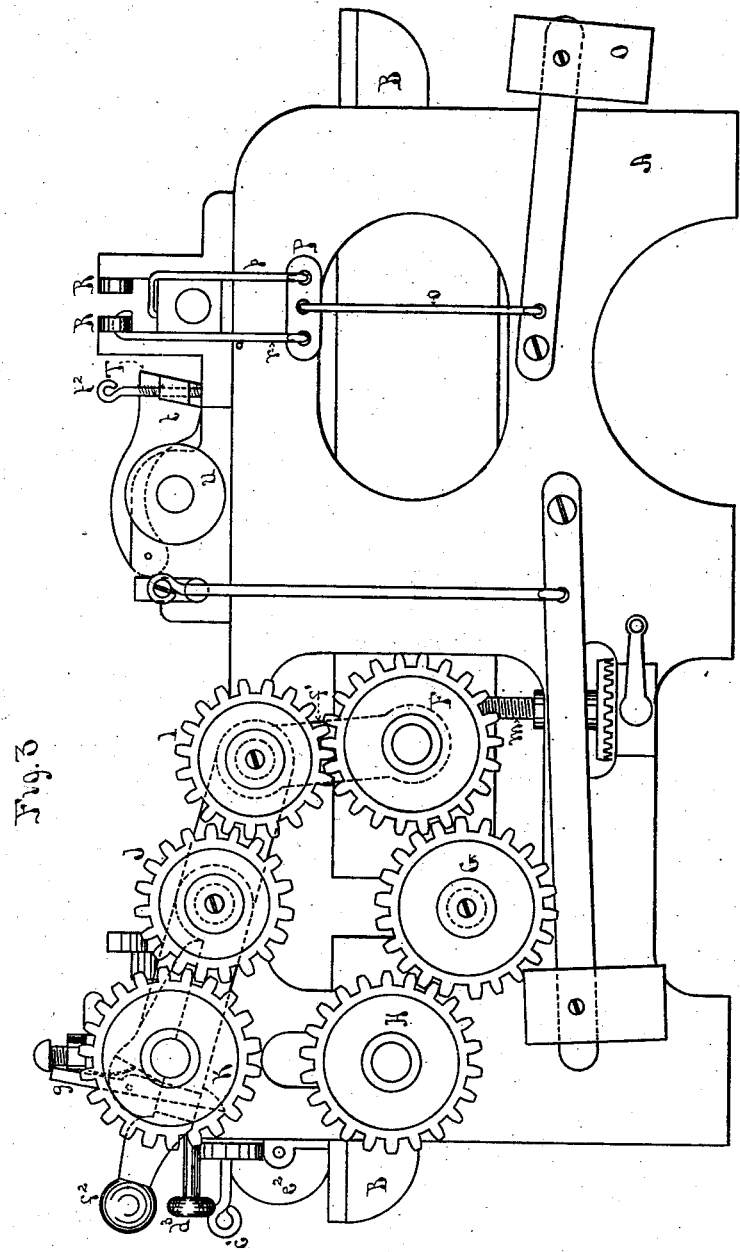
Figure 4:
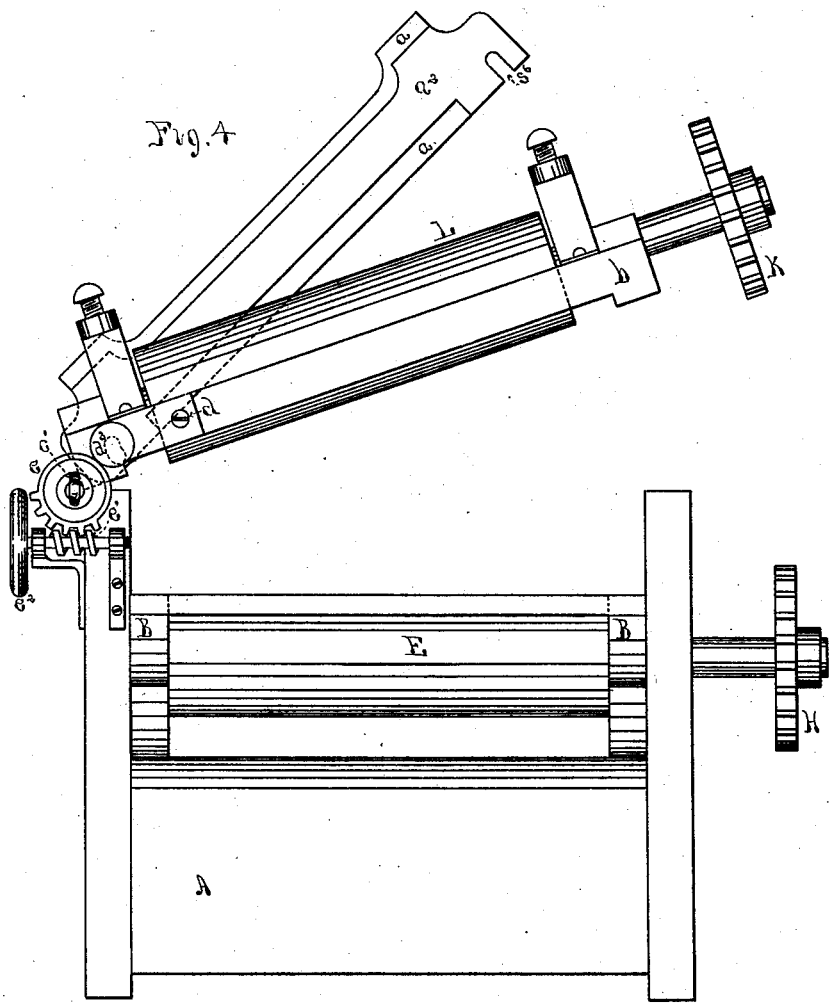
Figure 5:
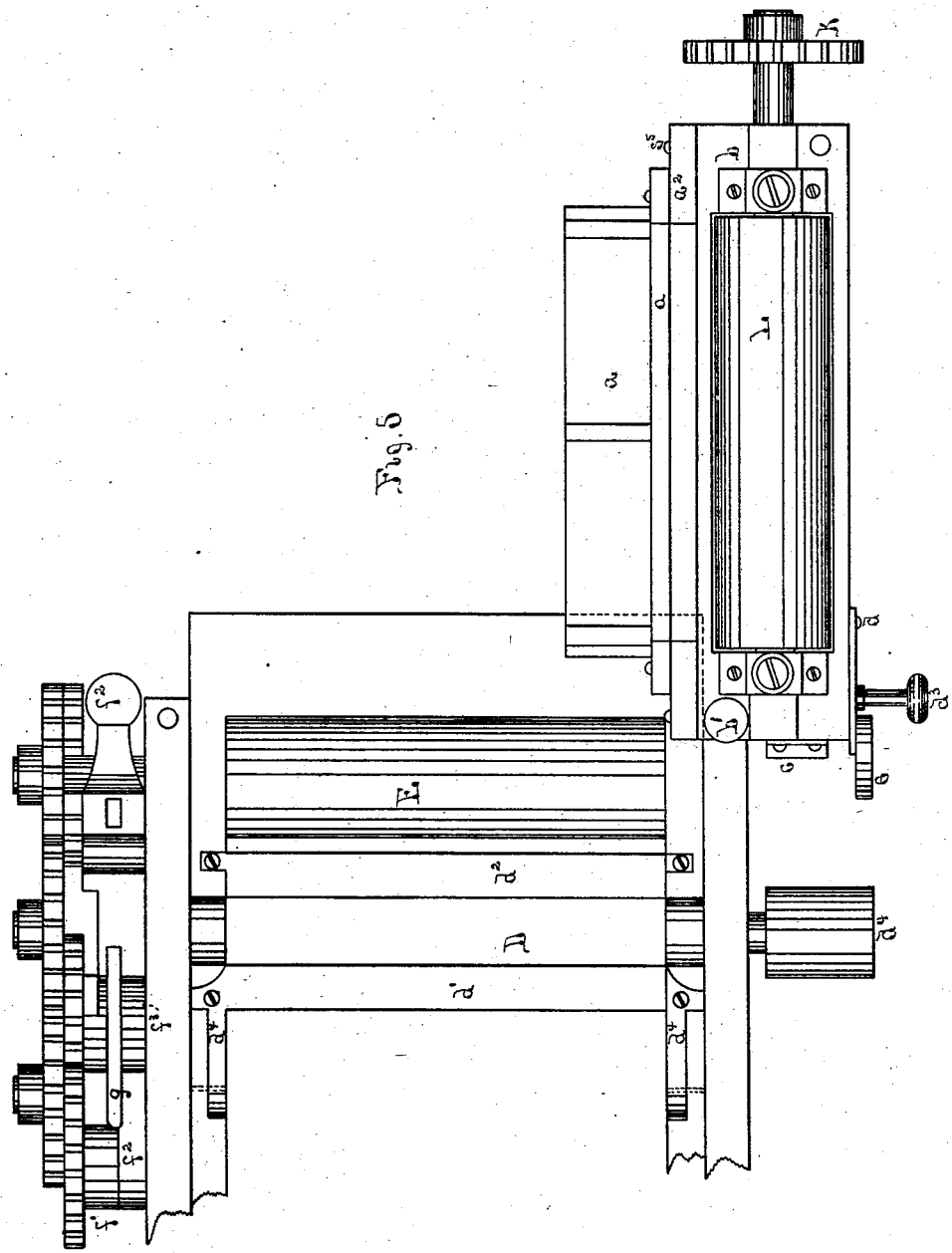
Figure 6:
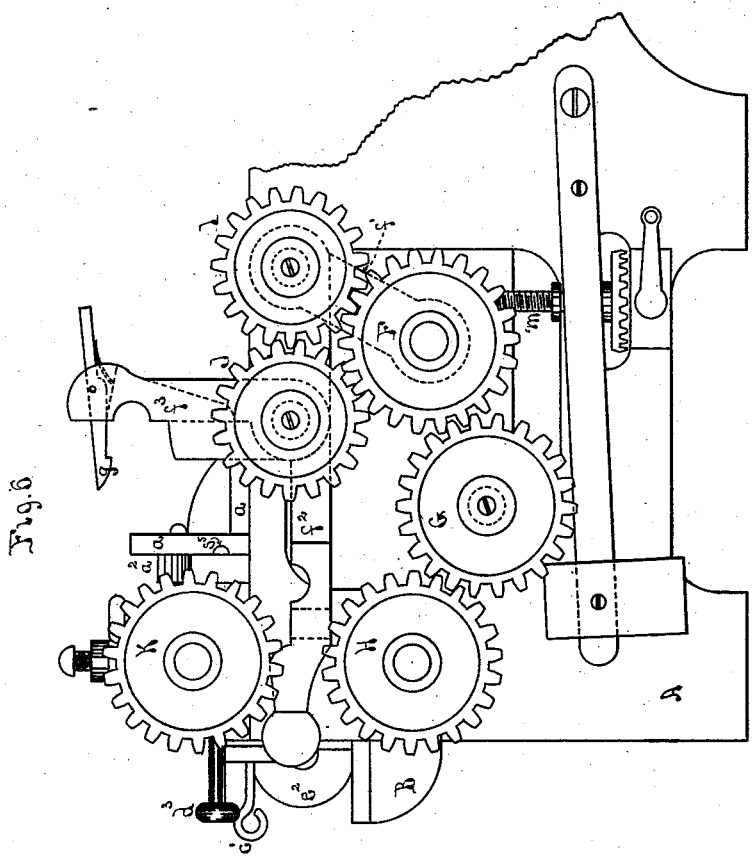

Figure 1 is a top-plan view. Fig. 2 is a longitudinal section on line O O of Fig. 1. Fig. 3 is a side elevation. Fig. 4 is an end elevation, with draft-roller partially elevated and pressure-plate shown at greater angle. Fig. 5 is a broken plan, with top draft-roller swung at right angles with the lower cutter on a horizontal plane. Fig. 6 is a broken elevation, showing train with screws attaching upper draft-roll frame to main frame removed. Fig. 7 is a front view, partly in section, of the front feed-rolls and their adjusting-levers with boxing seen in other views removed. Fig. 8 is a perspective of one end of the pressure-plate of the lower cutter and the bar to which it is attached. Fig. 9 is a plan view of one end of the chip-breaker of the lower cutter. Fig. 10 is an end view of the same. Fig. 11 is a front view of the chip-breaker of the upper cutter and the bar to which they are attached.

Similar letters of reference refer to similar parts throughout the several views.

A is the frame of the machine. B is the bed carrying the lag-feed C, lower cutter, D, lower pressure-bars, $d'$ $d^2$, and lower draft-roller, E, with the train of gears consisting of the wheels F, G, H, I, and J, which communicate motion to the lower draft-roller, E, and through the wheel K to the upper draft-roller, L.

The bed, with its connecting parts, is raised or lowered by the screws $m\ m$, one on either side of the machine, or in any other ordinary or convenient manner.

N N are the upper front pressure-rollers, which, acting in conjunction with the lag-feed, feed the stock into the machine. Each of these rollers extends only part of the way over the bed, so that when the machine is used to plane narrow stock two pieces can be properly fed to the machine at one time, each roller being able to accommodate itself to the different thickness of stock passing under it independent of the action of the other.

Each roller is acted upon by a weight, O, whose pressure is brought to bear equally on the boxes at the ends of the roller, in which the shaft of the roller rotates by means of the equal-armed levers P and R, and the links $o$ $p\ r$, so that either end of each roller is free to rise without raising any other end of any roller, or both ends of each roller may be raised, and in either case the pressure upon the stock passing under the roll will always continue the same, thus permitting each roller to adapt itself to stock whose edges are of different thickness.

S S are the chip-breakers for the upper cutter. These are made in separate parts and attached to the chip-breaker bar T, by means of screws $s$ passing through the chip-breaker bar in slotted holes, thus permitting the same freedom of motion as exists in the feed-rollers described. The bar T swings on the arms $t$ on a radius somewhat greater than that on which the cutters revolve, and is adjusted in position by the set-screws $t^2$, which, passing through the ends of the bar T down upon the frame A, prevent the weight of the bar from coming upon the chip-breakers, and permit of such adjustment that when a thin chip is being taken from the stock being worked only the weight of the chip-breaker S is brought upon the stock; but when, on account of irregularities in the thickness, a thicker chip is cut to bring the stock to dimensions, and greater pressure is desirable, because of the greater strength in the fiber to be cut away, the additional weight of the bar T is brought upon the stock. This result is obtained by adjusting the bar by means of the screws $t^2$, so that the chip-breakers S can rise through the distance of the thinner cut without bringing the bottom of the bar into contact with the heel of the chip-breaker extending back under it; but, being brought into contact by the further lifting of the chip-breakers, caused by greater thickness and inequalities in the stock passing beneath them, the weight of the bar T is added to that of the chip-breaker, serving to prevent the cutter from loosening the fibers of wood in advance of itself. I am thus enabled to supply an equable pressure on the feed-rolls to feed the stock into the machine, as is desirable, because no greater pressure is required to properly feed the stock on account of any irregularities in its thickness, and to supply a varying pressure to the chip-breaker, where greater pressure is desirable, when an irregularity occurs which requires the cutter to remove a greater amount of material from the surface of the stock.

W is the cutter-head, to which the cutters which operate on the upper side of the stock are attached. These parts are constructed in the usual manner.

X is a pressure-roller, bearing upon the stock as it passes out from under the cutter. This roll is weighted in the ordinary well-known manner.

$a$ is the pressure-plate, which serves as a bed to hold the stock firmly while being acted upon by the lower cutters. This bed is attached to a bar, $a^2$, by set-screws, which pass through slotted holes $s^4$, Fig. 8, in the perpendicular of the plate. The bar $a^2$ is attached to the frame of upper draft-roller, L, one end by a screw or pin in a round hole and the other end by a set-screw, $s^5$, in a slotted hole, $s^6$, Figs. 4 and 8, so that one end of it may be raised upon the pin as an axis until the plate is perpendicular to the cutter below it, without moving any other parts or making any change other than to loosen the screw passing through the open slot which holds the pressure-plate bar at one end to the frame $b$, through which it is attached to the main frame of the machine.

$b$ is the frame in which the upper draft-roller is mounted. This frame lies upon the frame A, and is attached thereto, when in position, by the screws $b'$ $b^2$ and hinge $c$, and has attached to it, by means of the screw $d$ and thumb-screw $d^3$, the plate carrying the worm-wheel $e$, which, when in position, engages with the screw $e'$, which is actuated by the hand-wheel $e^2$. The hinge $c$ has its pin or shaft $c'$, on which its parts move, made removable.

The upper draft-roller is driven by the gear K, which is actuated by the train F I J, the wheels I J being intermediate gears running upon studs placed upon the elbow-arms $f'$ $f^2$. The arm $f'$ swings upon a sleeve made concentric with the shaft of the wheel F, and is connected with the arm $f^2$ at a point axial with the wheel I, and the arm $f^2$ is connected, by means of a hinged box, with the shaft of the draft-roller L. The upper part of the arm $f^2$, containing the upper portion of the box which encircles the shaft, is held in position by the spring-catch $g$, which, when unfastened, permits the hinged cap $f^3$ of the arm to be thrown back, and the intermediate gear J to be moved out of engagement with wheel K, while intermediate gear I, swinging upon arm $f'$, whose length is equal to the pitch-radius of the two wheels F I, will remain engaged with the wheel F. When this is done, and the screws $b'$ $b^2$ are removed and the hand-wheel $e^2$ actuated, the upper draft-roller will be swung upward on the hinge $c$, and can be elevated to a position at right angles to the lower draft-roller, if desired, thus removing all impediment to the examination, adjustment, or removal of the cutters of the head D.

If, for any reason, it be desirable to remove the upper draft-roller without elevating it, it can be done by disengaging the train, as above described, replacing the screw $b'$, disconnecting the worm-wheel $e$ by loosening the thumb-screw $d^3$ in the slotted hole of the worm-wheel plate, elevating the wheel $e$, and removing the pin $c'$ of the hinge $c$, after which the upper draft-roller, its frame, and connecting parts can be swung horizontally upon the screw-pivot $b'$ into any position desired.

The wheel I being on an axis whose only movement is on a line concentric to wheel F, it is obvious that no movement of the axis of wheel I will affect the perfect engagement of wheels F and I, and as the wheel J is on a stud on an arm moving around a line axial with wheel I, when in operative position, it is obvious that no movement while in such position will disengage wheels J and I, and that therefore the wheel F may be raised and lowered without in any way affecting the action of the wheels F I J K upon one another.

The train of expansion-gears may be composed of more or less wheels without departing from the spirit of my invention, so long as the arm connected with the removable draft-roller is made detachable.

The wheel F is placed on the shaft of the drum driving the lag-feed, which shaft also has upon it a pulley (not shown in the drawings) by which it is driven from counter-shafting, as is usual in such machines.

The top cutter-head is driven by a belt acting on the pulley $u$, and the lower by a belt acting on the pulley $d^7$.

The lower pressure-bars, $d'$ and $d^2$, are made to set into the bed B and move with it, being made adjustable, so as to be properly aligned with the bed, and adjusted in reference to the lower cutter. The front one, or that before the lower cutter, $d'$, is attached to arms marked $d^4$, which are pivoted at their ends, so that when the machine is not in operation this pressure-bar can be lifted up through the path of the stock as it is fed into the machine, whereby it is swung away from the cutter, so that that part of the machine can be more readily examined, repaired, or sharpened. This pressure-bar rests, when in operative position, upon the bed, and the arms are intended only to facilitate its removal and replacement without readjustment. As the stock being operated upon is planed to dimensions when it passes between this pressure-bar and the pressure-plate, it can therefore be rigidly sustained, when in operation, by set-screws, as shown.

It will be observed that this machine will operate equally well whether upon wide or narrow stock; that a piece of stock the entire width of the machine can be planed, or that two pieces of different or varying thickness can be accurately and properly fed to the machine and planed to dimensions; that the draft-rollers are made adjustable by the same movement that adjusts the other parts of the machine to operate on different thickness of stock, and at the same time the top draft-roller can be removed from its operative position for the greater convenience of examination, adjustment, and repair of other parts of the machine.

I am aware of the existence of mechanism such as is described in Patents No. 132,663, issued October 29, 1872, and No. 77,013, issued April 21, 1868, and I disclaim anything therein described as of my invention; but what I do claim as of my improvement is an organized machine adapted to plane both sides of a board at the same time and withdraw the same from the last cutter by draft-rolls, which are adjustable with the other parts to plane any desired thickness of lumber, and one of which can be swung away from its adjacent cutter to permit of access thereto.

What I claim as new and of my invention is—

1. The combination of the roller N, equal-armed lever R, which bears upon one of the roller-boxes, the equal-armed lever P, one of whose arms is connected by the link $r$ to the lever R, and the other by the link $p$ to the box at the other end of the roller, with the weight O, substantially as described.

2. The combination of the vertically-adjustable frame B, carrying the lower draft-roll, E, and cylinder D, with the swinging frame $b$, carrying the opposite draft-roll, L, substantially as described.

3. The combination of the movable frame $b$, provided with the draft-roll L, worm-wheel $e$, worm $e'$, hinge $c$, provided with the removable pin $c'$, and frame A, substantially as described.

4. The combination of the draft-rollers E and L, wheels F and K, and connecting-arm $f^2$, provided with a hinged box, which encircles the shaft driven by one of the wheels, whereby it is made detachable from one of its points of connection, substantially as described.

5. The combination of the frame A, carrying the bed which bears the cutter D and draft-roll E, with the frame $b$, carrying the draft-roll L, placed on top of the frame A, and which can be swung upon the pivot $b'$ horizontally to a position at right angles to the cutter-head, substantially as described.

6. The combination of the frame A, carrying the vertically-adjustable bed which bears the cutter D and draft-roll E, with the swinging frame $b$, which carries the upper draft-roll, L, substantially as described.

7. In a planing-machine, the combination of two cutters adapted to plane both sides of a board at the same time, and which can be adjusted to plane different thicknesses of lumber, with a pair of draft-rolls, which withdraw the boards from the last cutter, and which are adjusted with the other parts to different thicknesses of lumber, and one of which is mounted in a frame which can be swung away from the bed to give access to the lower cutter, substantially as described.

S. A. WOODS.

Witnesses:
 FRED. G. PETTIGROVE,
 LEPINE C. RICE.